United States Patent
Vinton

(10) Patent No.: US 9,682,662 B2
(45) Date of Patent: Jun. 20, 2017

(54) VEHICLE SEAT BACK INCLUDING A PYROTECHNIC FASTENER

(71) Applicant: Ford Global Technologies, LLC, Dearborn, MI (US)

(72) Inventor: Jeffrey Steven Vinton, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 96 days.

(21) Appl. No.: 14/945,910

(22) Filed: Nov. 19, 2015

(65) Prior Publication Data

US 2017/0144612 A1    May 25, 2017

(51) Int. Cl.
  *B60R 11/02* (2006.01)
  *B60N 2/42* (2006.01)
  *B60R 11/00* (2006.01)

(52) U.S. Cl.
  CPC ........... *B60R 11/0229* (2013.01); *B60N 2/42* (2013.01); *B60R 2011/008* (2013.01); *B60R 2011/0015* (2013.01)

(58) Field of Classification Search
  None
  See application file for complete search history.

(56) References Cited

U.S. PATENT DOCUMENTS

| | | | |
|---|---|---|---|
| 6,199,900 B1 * | 3/2001 | Zeigler | B60N 2/4829 280/730.2 |
| 6,420,803 B1 | 7/2002 | Woodall et al. | |
| 7,083,230 B2 * | 8/2006 | Kull | B60N 2/4242 297/216.1 |
| 7,959,226 B2 * | 6/2011 | Hattori | B60N 2/64 297/188.05 |
| 8,191,830 B2 * | 6/2012 | Mastrolia | B64D 25/10 244/122 A |
| 9,352,839 B2 * | 5/2016 | Gehret | B60R 21/207 |
| 9,487,157 B1 * | 11/2016 | Vinton | B60N 2/64 |
| 9,555,726 B2 * | 1/2017 | Jafri | B60R 11/0235 |
| 2003/0025367 A1 | 2/2003 | Boudinot | |
| 2009/0008974 A1 | 1/2009 | Hattori et al. | |
| 2009/0085383 A1 | 4/2009 | Hicks et al. | |
| 2010/0231547 A1 | 9/2010 | Pryor | |
| 2013/0009430 A1 * | 1/2013 | Islam | B60R 21/04 297/216.1 |
| 2013/0147242 A1 * | 6/2013 | Santana-Gallego | B60R 21/23138 297/216.12 |

(Continued)

FOREIGN PATENT DOCUMENTS

| | | |
|---|---|---|
| CN | 201285634 Y | 8/2009 |
| CN | 203221966 U | 10/2013 |
| CN | 203496792 U | 3/2014 |

(Continued)

*Primary Examiner* — David E Allred
(74) *Attorney, Agent, or Firm* — Frank MacKenzie; Bejin Bieneman PLC

(57) ABSTRACT

A seat back for a vehicle includes a frame and an electronic display. A pyrotechnic fastener supports the electronic display on the frame. The pyrotechnic fastener includes a first portion fixed to the frame, a second portion fixed to the electronic display, and a pyrotechnic element. During a frontal impact of the vehicle, the pyrotechnic element may be activated to lower the electronic display resulting in increased travel space for the occupant.

19 Claims, 7 Drawing Sheets

(56) References Cited

U.S. PATENT DOCUMENTS

2015/0239373 A1* 8/2015 Weng .................. B60N 2/1615
297/216.1

FOREIGN PATENT DOCUMENTS

| CN | 203496795 U | 3/2014 |
| CN | 204279267 U | 4/2015 |
| CN | 204279269 U | 4/2015 |
| KR | 100867708 B1 | 11/2008 |

* cited by examiner

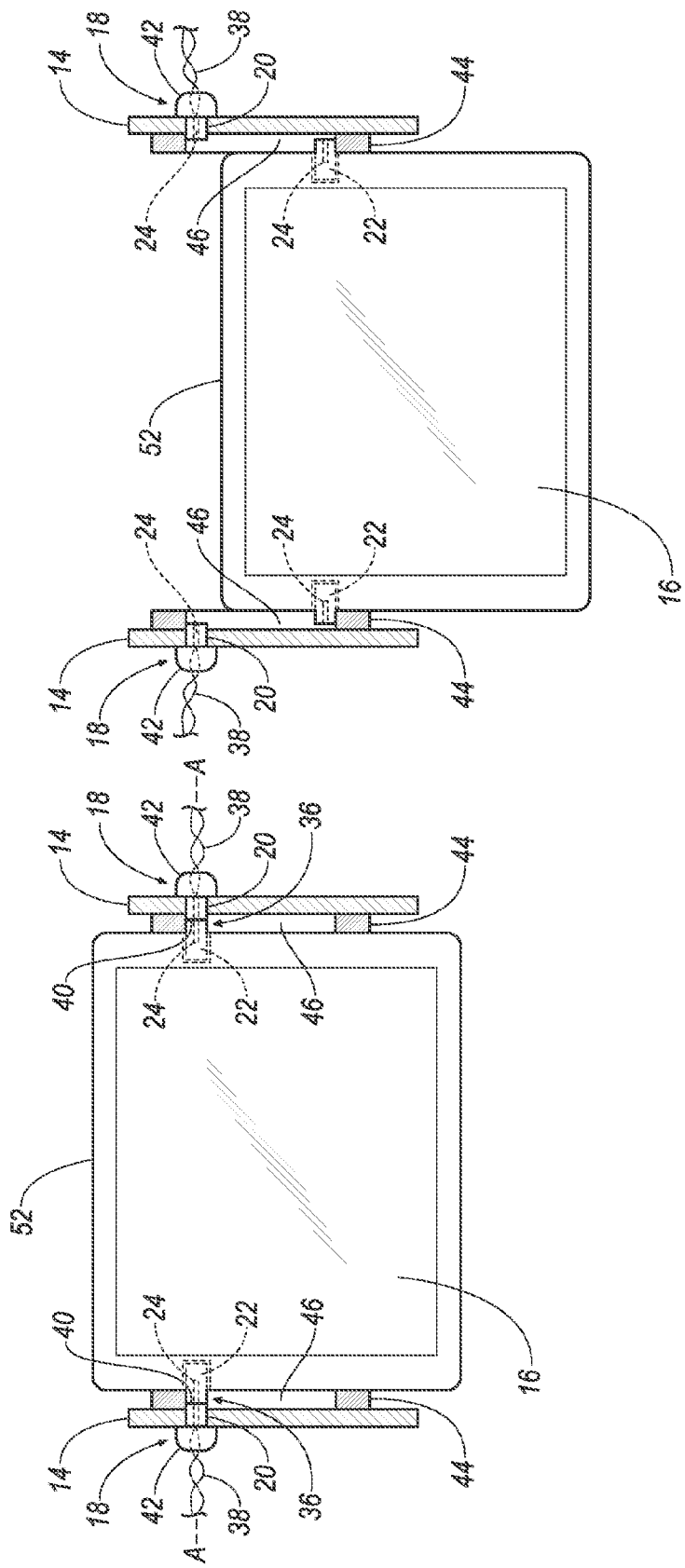

VEHICLE SEAT BACK INCLUDING A PYROTECHNIC FASTENER

BACKGROUND

Electronic displays on vehicle seat backs offer visual access to information and entertainment, i.e., infotainment, and, for example, can be used to expand the display of hand held electronic devices for viewing stored movie playback, music videos, etc. The electronic display may be positioned to be viewed by occupants seated in a rear row of seats. For example, the electronic display may be mounted to a roof of the vehicle, e.g., an overhead flip-down display assembly, or may be mounted to a seat back.

The occupant may contact the electronic display in a vehicle impact, e.g., a front end impact. As such, the seat back may be designed to comply with Head Injury Criterion (HIC) testing standards. The HIC is a measure of the likelihood of head injury arising from an impact. The U.S. National Highway Traffic Safety Administration (NHTSA) utilizes the HIC as a tool for measuring head injury, and is a primary factor in determining the vehicle safety rating.

There remains an opportunity to design a vehicle seat back including an electronic display that allows for a reduction of the impact energy transferred to the occupant.

BRIEF DESCRIPTION OF THE DRAWINGS

FIG. 5 is a side view of the electronic display and the second portion in the first position.

FIG. 6 is a side view of the electronic display and the second portion in the second position

DETAILED DESCRIPTION

Figure 1:
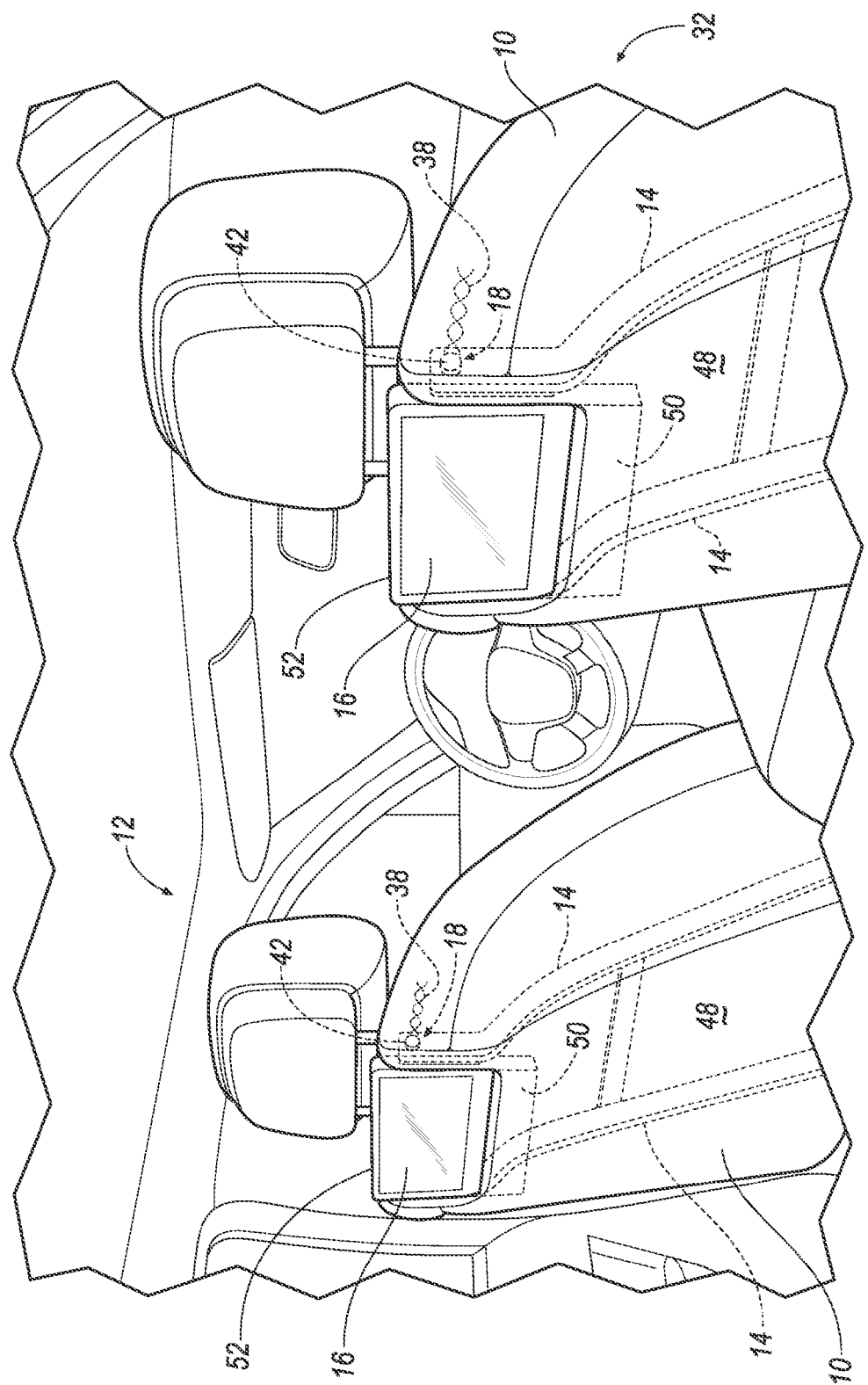
FIG. 1 is a perspective view of a portion of a vehicle including a seat back and an electronic display in a viewing position with a pyrotechnic fastener in hidden lines.

With reference to the Figures, wherein like numerals indicate like parts throughout the several views, FIGS. 1-4 and 7-8 show a seat back 10, 100 for a vehicle 12. The seat back 10, 100 includes a frame 14 and an electronic display 16. A pyrotechnic fastener 18 supports the electronic display 16 on the frame 14. The pyrotechnic fastener 18 includes a first portion 20 fixed to the frame 14, a second portion 22 fixed to the electronic display 16, and a pyrotechnic element 24.

Figure 2:
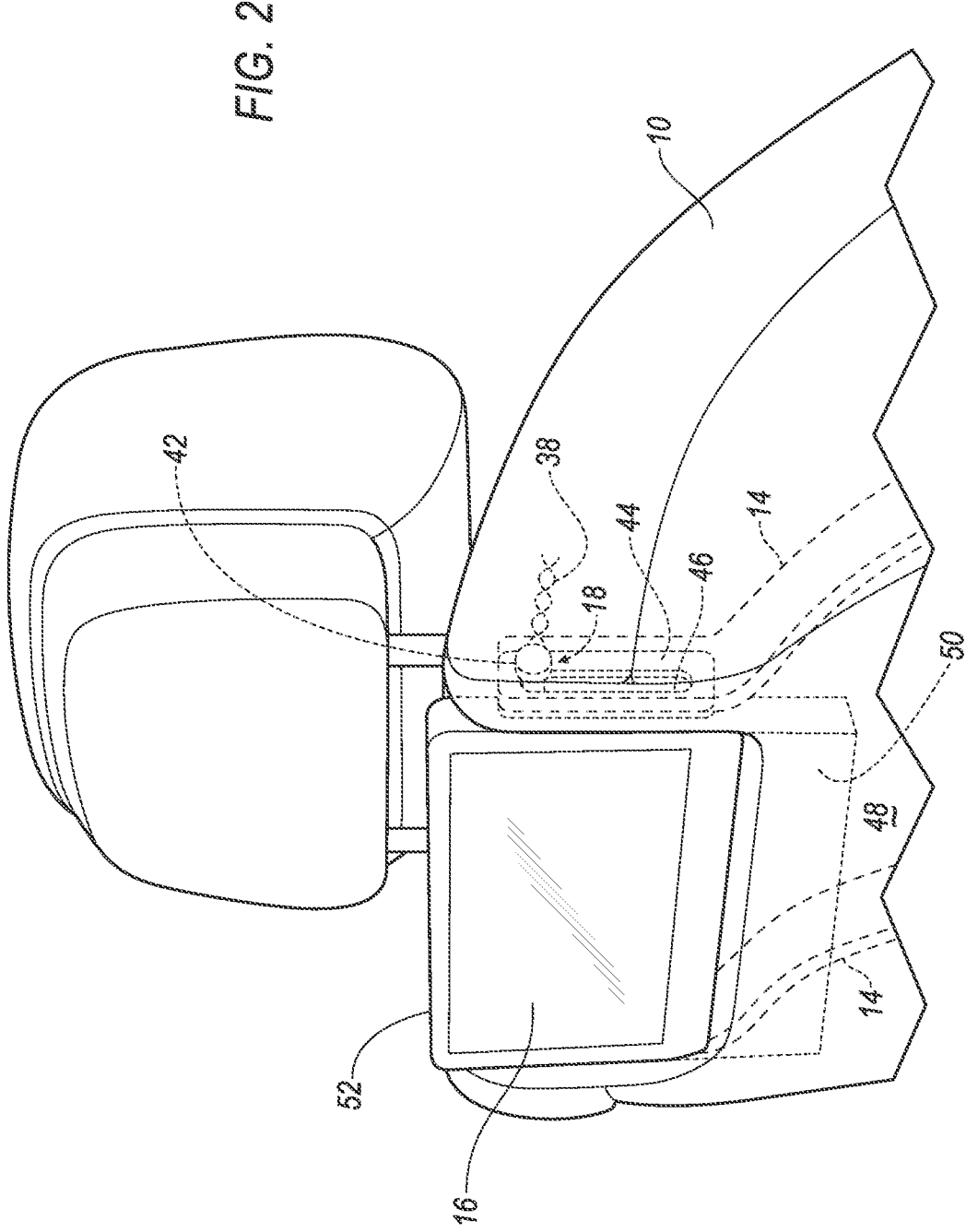
FIG. 2 is a perspective view of the seat back and the electronic display in the viewing position with the pyrotechnic fastener and a guide in hidden lines.
Figure 3:
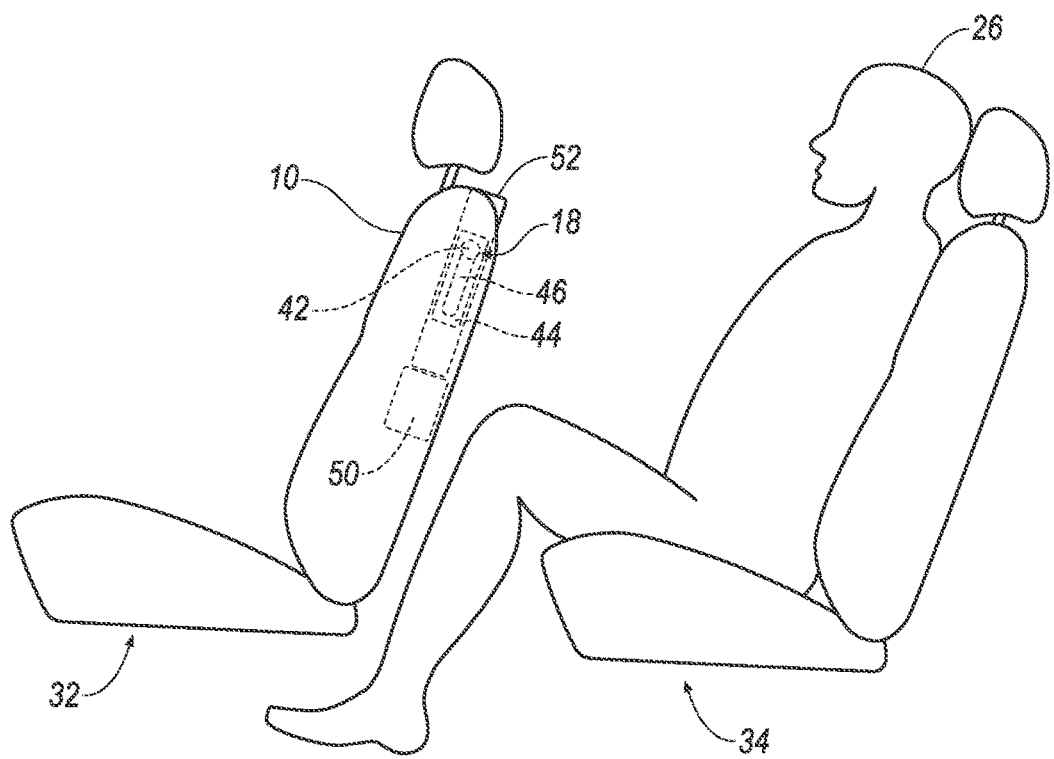
FIG. 3 is a side view of an occupant seated in front of the electronic display with the pyrotechnic fastener shown in hidden lines in a first position.
Figure 4:
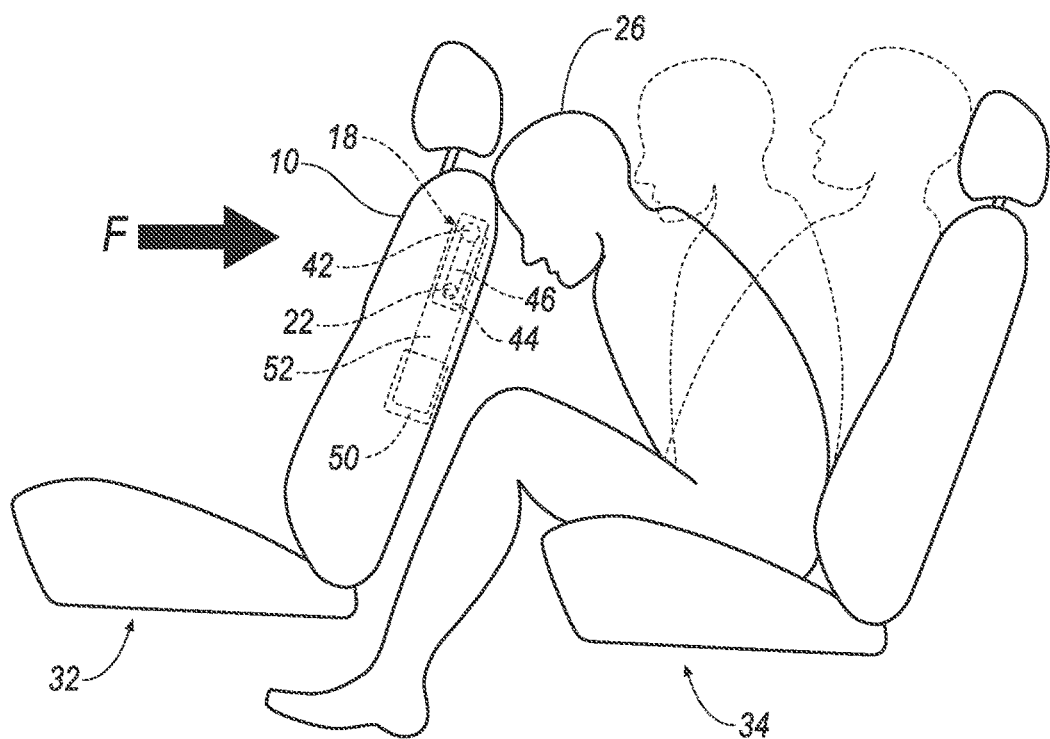
FIG. 4 is a side view of a head of the occupant moving toward the electronic display with a second portion of the pyrotechnic fastener in hidden lines in a second position.

As shown in FIGS. 3-4, an occupant 26 may be seated behind the seat back 10, 100, and may move toward the electronic display 16, for example, during a frontal impact of the vehicle 12. As the occupant 26, e.g., head of the occupant 26, moves toward the electronic display 16 in a forward and/or downward motion, the pyrotechnic element 24 may be selectively activated based on the magnitude of the impact, as set forth below. For example, as set forth below, during a front end impact (identified with "F" in FIG. 4), the pyrotechnic element 24 may be activated allowing the second portion 22 of the pyrotechnic fastener 18, which is fixed to the electronic display 16, to move from a first position, as shown in FIGS. 1-3, 5 and 7-8, to a second position, as shown in FIGS. 4 and 6. The second portion 22 may move from the first position to the second position under the force of gravity and/or from impact by a head of an occupant 26. In this situation, the downward movement of the electronic display 16 provides increased travel space for the occupant 26, e.g., head of the occupant 26. The increased travel space may result in the occupant 26 avoiding contact with the electronic display 16. In the case of contact, the increased travel space and the electronic display 16 having low resistance to movement as it travels downward may allow for a reduction of impact energy transferred to the occupant 26.

Figure 7:
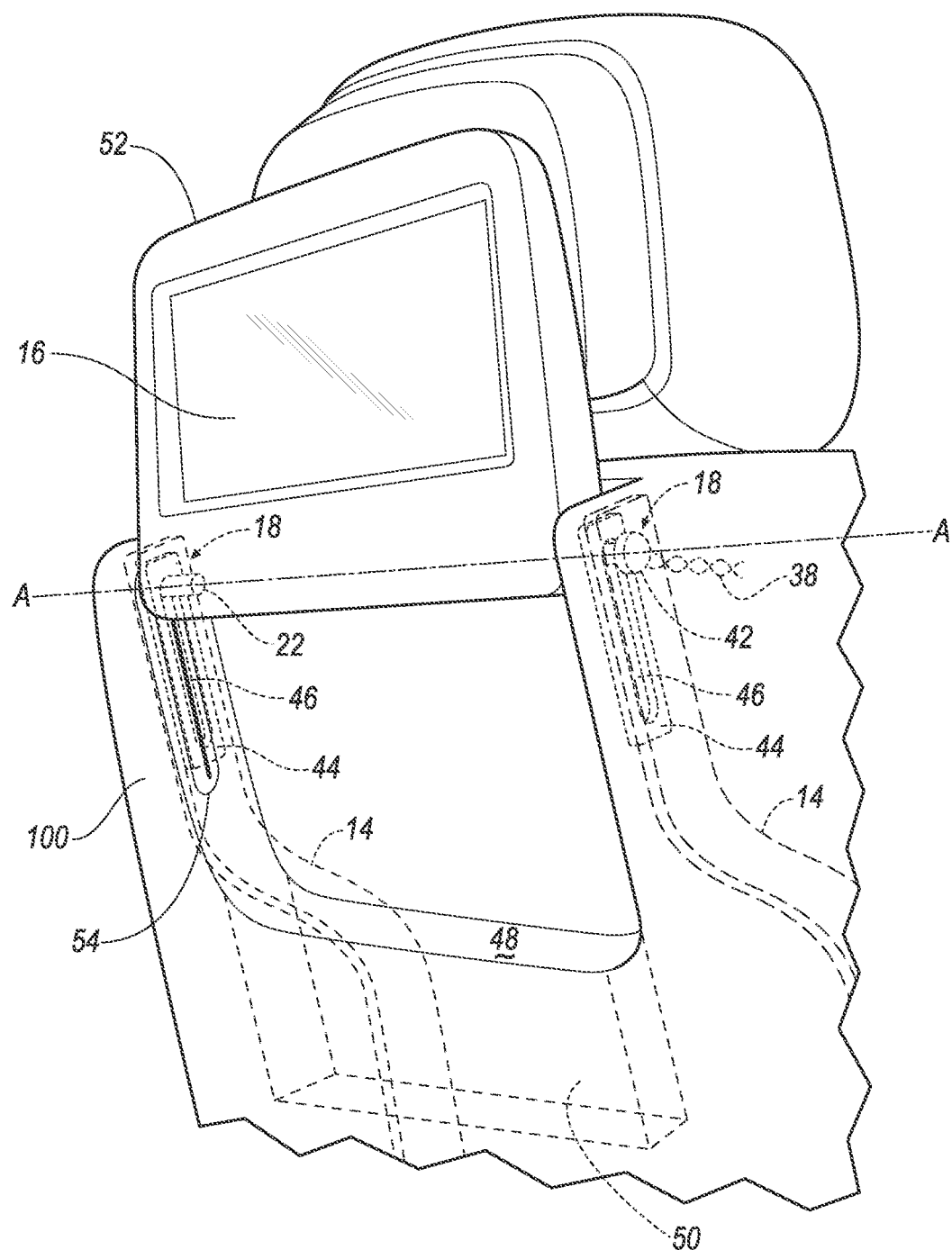
FIG. 7 is a perspective view of another embodiment of the seat back and the electronic display in the viewing position with the pyrotechnic fastener and the guide in hidden lines.
Figure 8:
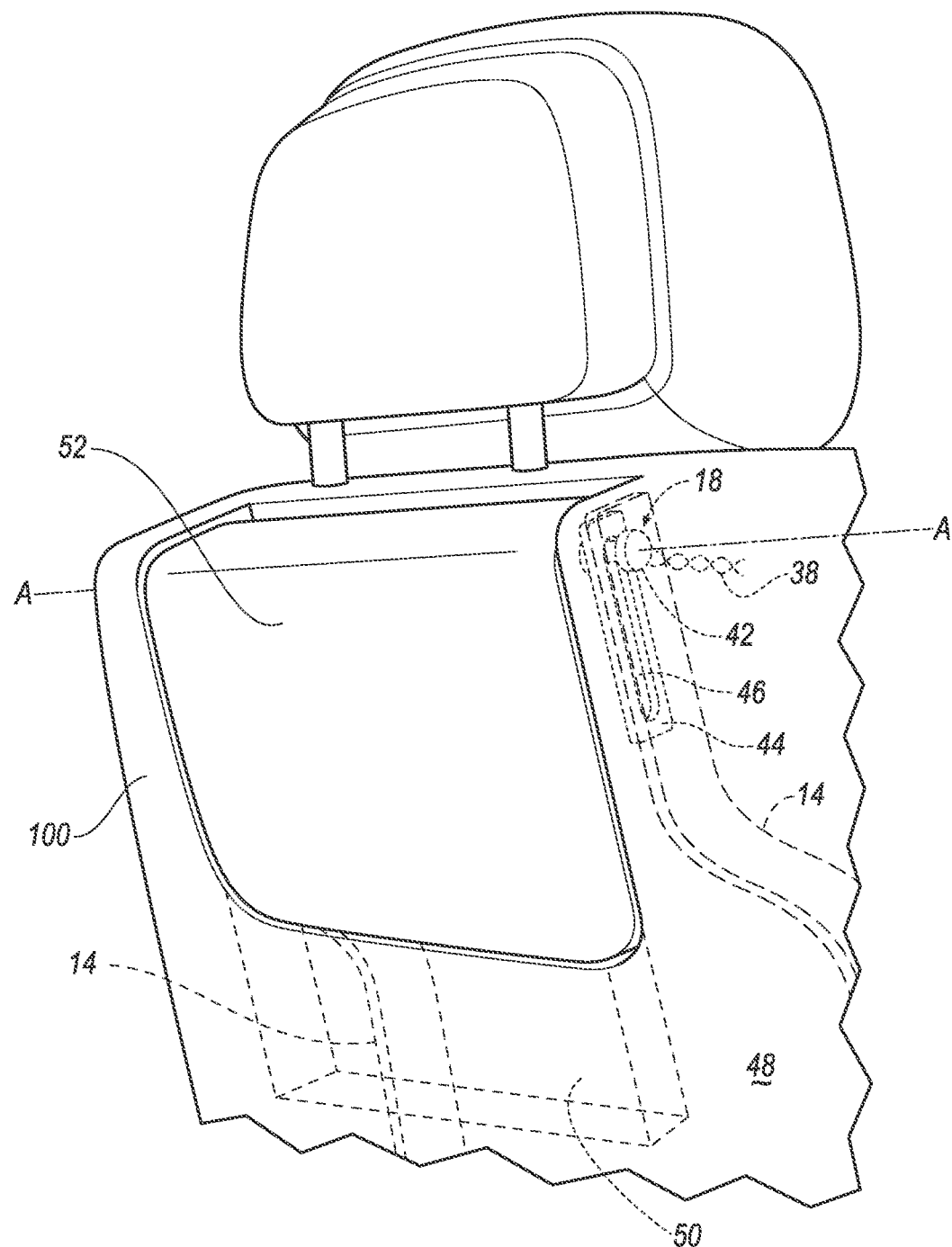
FIG. 8 is a perspective view of the seat back and the electronic display of FIG. 7 in a stowed position with the pyrotechnic fastener and the guide in hidden lines.

As set forth below, a first embodiment of the seat back 10 is shown in FIGS. 1-6, and a second embodiment of the seat back 100 is shown in FIGS. 7-8. Common numerals are used to identify common features in the various embodiments.

The seat back 10, 100 may be a component of a vehicle impact system 28. The vehicle impact system 28 may include a controller 30 in communication with the pyrotechnic fastener 18. Specifically, as set forth below, for example, the vehicle impact system 28 may sense an impact of the vehicle 12 and may activate the pyrotechnic element 24 in response to the sensed impact. In addition, the vehicle impact system 28 may sense the type of impact, e.g., based on direction, magnitude, etc., and may active the pyrotechnic element 24 in response to the type of impact.

With reference to the Figures, the vehicle 12 may include two adjacent seat backs 10, 100, i.e., arranged in a front row 32. Similarly, with reference to FIGS. 3-4, the vehicle 12 may include two seat backs 10, 100 arranged in the front row 32 and a rear row 34. The vehicle 12 may include any suitable number of seat backs 10, 100, arranged in any suitable number of rows, and one or more of the seat backs 10, 100 may include the frame 14, electronic display 16, and pyrotechnic fasteners 18 described herein. The vehicle 12 may be of any suitable type, e.g., a car, truck, SUV, etc.

The pyrotechnic fastener 18 may include a shaft 36. The shaft 36 includes the first portion 20 and the second portion 22. The pyrotechnic element 24 may be disposed in the shaft 36. The pyrotechnic element 24 may be between the first portion 20 and the second portion 22. For example, as shown in FIG. 5, the pyrotechnic element 24 is disposed in the shaft 36 in both the first portion 20 and the second portion 22. Alternatively, the pyrotechnic element 24 may be disposed only in the first portion 20 or the second portion 22 of the shaft 36. Alternatively, the pyrotechnic element 24 may be disposed exterior to and/or spaced from the shaft 36.

The pyrotechnic element 24 may include a pyrotechnic charge (not numbered). The pyrotechnic element 24 may be activated by an electric current delivered to the pyrotechnic fastener 18 through wires 38. A boundary 40 may separate the first portion 20 from the second portion 22, as best shown in FIG. 5. As set forth below, when the pyrotechnic element 24 is activated, the pyrotechnic charge may expand the pyrotechnic element 24 and sever the pyrotechnic fastener 18, e.g., along the boundary 40 between the first portion 20 and the second portion 22. Alternatively, when the pyrotechnic element 24 is activated, the pyrotechnic charge may produce a shockwave along the pyrotechnic fastener 18 and sever the pyrotechnic fastener 18, e.g., along the boundary 40. The boundary 40 may be weakened by a score (not shown) in the circumference of the pyrotechnic fastener 18, i.e., a circumferential groove, between the first portion 20 and the second portion 22 to encourage severance at the boundary 40.

The first portion 20 of the pyrotechnic fastener 18 may be integral with the second portion 22, i.e., formed simultaneously as a single continuous pyrotechnic fastener 18. For example, the first portion 20 and the second portion 22 may be integrally formed by hot-forging, or alternatively, may be integrally formed in any suitable fashion. In the alternative to being integrally formed, the first portion 20 and the second portion 22 may be formed separately from each other and subsequently assembled, e.g., by welding, etc.

The pyrotechnic fastener 18 may be formed of any suitable material, e.g., metal such as steel, aluminum, etc. Alternatively, for example, the pyrotechnic fastener 18 may be formed of an engineered plastic, e.g., thermoplastics polyurethane (TPU), polyarylamide (PARA), etc.

With reference to FIGS. 5-6 and as set forth above, the pyrotechnic fastener 18 includes the first portion 20 fixed to the frame 14, and the second portion 22 fixed to the electronic display 16. The first portion 20 may include threads that engage with the frame 14, e.g., the frame 14 may include mating threads. The first portion 20 may include a fastener head 42 that may be used to further secure the first portion 20 to the frame 14. The second portion 22 may include threads that engage with the electronic display 16, e.g., the electronic display 16 may include mating threads.

As shown in FIGS. 2-8, the seat back 10, 100 may include a guide 44. The guide 44 may be attached to the frame 14, e.g., fixed to the frame 14. For example, the guide 44 may be welded and/or bolted to the frame 14. The seat back 10, 100 may include one or more guides 44. For example, as shown in FIG. 7, the seat back 10, 100 includes two guides 44 spaced from each other.

The guide 44 may be formed of any suitable material, e.g., metal such as steel, aluminum, etc. Alternatively, for example, the guide 44 may be formed of an engineered plastic, e.g., acrylonitrile butadiene styrene (ABS), sheet molding compound (SMC) composites, etc. The frame 14 may be formed of any suitable material, e.g., metal such as steel, aluminum, etc. Alternatively, the frame 14 may be formed of any suitable plastic material, e.g., carbon fiber reinforced plastic (CFRP), glass fiber-reinforced semifinished thermoplastic composite (organo sheet), etc.

The guide 44 may receive the pyrotechnic fastener 18. For example, the guide 44 may include a slot 46 that receives the second portion 22 of the pyrotechnic fastener 18, as shown in FIGS. 2-8. After the pyrotechnic element 24 is activated, the second portion 22 may be moveable along the slot 46 from the first position, as shown in FIGS. 1-3, 5 and 7-8, to the second position, as shown in FIGS. 4 and 6.

As shown in FIGS. 1-2 and 7-8, the seat back 10, 100 may include trim 48 supported by the frame 14. At least a portion of the trim 48 may define a cavity 50 that receives the electronic display 16 as the second portion 22 of the pyrotechnic fastener 18 travels from the first position to the second position. The trim 48 may cover the cavity 50 below the electronic display 16 and may break away so that the cavity 50 may receive the electronic display 16 as the second portion 22 travels from the first position to the second position. The trim 48 may be formed of any suitable material such as a polymer, e.g., nylon, plastic, polypropylene (PP), acrylonitrile butadiene styrene (ABS), vinyl, etc.

The electronic display 16 may be of any suitable type for displaying images and/or video, e.g., entertainment, informational, navigational, etc. The electronic display 16 may be of any suitable type, for example, a liquid crystal (LCD) display, light emitting diode (LED) display, etc. The electronic display 16 may include one or more input features, e.g., touch screen, buttons, knobs, etc., for inputting and/or selecting data. The electronic display 16 may also include audio speakers.

As set forth above, the pyrotechnic fastener 18 supports the electronic display 16 on the frame 14 of the seat back 10, 100. For example, as shown in FIGS. 1-2 and 5-8, the electronic display 16 may be mounted to a housing 52. The electronic display 16 may be fixed to the housing 52 and the housing 52 may extend around a periphery of the electronic display 16. The housing 52 may support the electronic display 16 on the pyrotechnic fastener 18 and may house components of the electronic display 16, e.g., wires, electronic circuitry, etc. For example, the housing 52 may include sleeves, e.g., threaded inserts that receive the second portion 22 along a fastener axis A. The housing 52 may, for example, be formed of any suitable material such as a polymer, e.g., nylon, plastic, polypropylene (PP), acrylonitrile butadiene styrene (ABS), vinyl, etc.

As set forth above, the first embodiment of the seat back 10 is shown in FIGS. 1-6. The electronic display 16 may be fixed, i.e., stationary, relative to the seat back 10. As best shown in FIGS. 1-2, in a viewing position, the electronic display 16 may be exposed for viewing by the occupant 26.

With reference to FIGS. 5-6 and as set forth above, when the vehicle impact system 28 activates the pyrotechnic element 24, i.e., provides an impulse to the pyrotechnic charge, for example, during a frontal impact of the vehicle 12, the pyrotechnic fastener 18 may sever at the boundary 40. The pyrotechnic fastener 18 no longer supports the electronic display 16 to the frame 14, and the second portion 22 is free to move from the first positon to the second position. The second portion 22, which is still fixed to the electronic display 16, may travel from the first position, as shown in FIG. 5, to the second position, as shown in FIG. 6 along the slot 46 under the force of gravity on the electronic display 16 and/or contact by the occupant 26 against the electronic display 16. As set forth above, the cavity 50 receives the electronic display 16 as the second portion 22 travels to the second position. In the event the occupant 26, e.g., head of the occupant 26, makes contact with the electronic display 16, the contact force generated will assist the force of gravity in driving the second portion 22 from the first position to the second position. In any event, occupant 26 travel space may be increased.

As set forth above, the second embodiment of the seat back 100 is shown in FIGS. 7-8. The electronic display 16 may be movable between the viewing position, as shown in FIG. 7, and a stowed position, as shown in FIG. 8. For example, the electronic display 16 may be rotatable about the fastener axis A between the stowed position and the viewing position. Alternatively, or in addition to rotation, the electronic display 16 may move translationally relative to the seat back 100 between the stowed position and the viewing position. The pyrotechnic fastener 18 and the downward movement of the pyrotechnic fastener 18 of the second embodiment of the seat back 100 is similar to the first embodiment of the seat back 10 described above.

With continued reference to the second embodiment, the housing 52 and the electronic display 16 may, for example, move together as a unit relative to the seat back 100 between the stowed position and the viewing position. For example, as shown in FIGS. 7 and 8, the housing 52 and the electronic display 16 may rotate together as a unit about the fastener axis A. As shown in FIG. 7, in the viewing position, the electronic display 16 may be exposed for viewing by the occupant 26. As shown in FIG. 8, in the stowed position, the electronic display 16 is disposed between, i.e., sandwiched between, the housing 52 and the seat back 100.

With reference to FIGS. 7-8, for example, the electronic display 16 and the housing 52 may be fixed relative to the pyrotechnic fastener 18 and the pyrotechnic fastener 18 may be rotatable relative to the guide 44 about the fastener axis A between the stowed position and the viewing position. As another example, the pyrotechnic fastener 18 may be rotationally fixed relative to the guide 44 and the electronic display 16 and the housing 52 may rotate relative to the pyrotechnic fastener 18 about the fastener axis A between the stowed position and the viewing position.

With reference to FIG. 7, a cover 54 may be supported by the trim 48 along the slot 46 to conceal components of the second embodiment of the seat back 100, e.g., the pyrotechnic fastener 18, guide 44, etc. The cover 54 may be formed of any suitable material, e.g., nylon, plastic, rubber, metal, etc.

Figure 9:
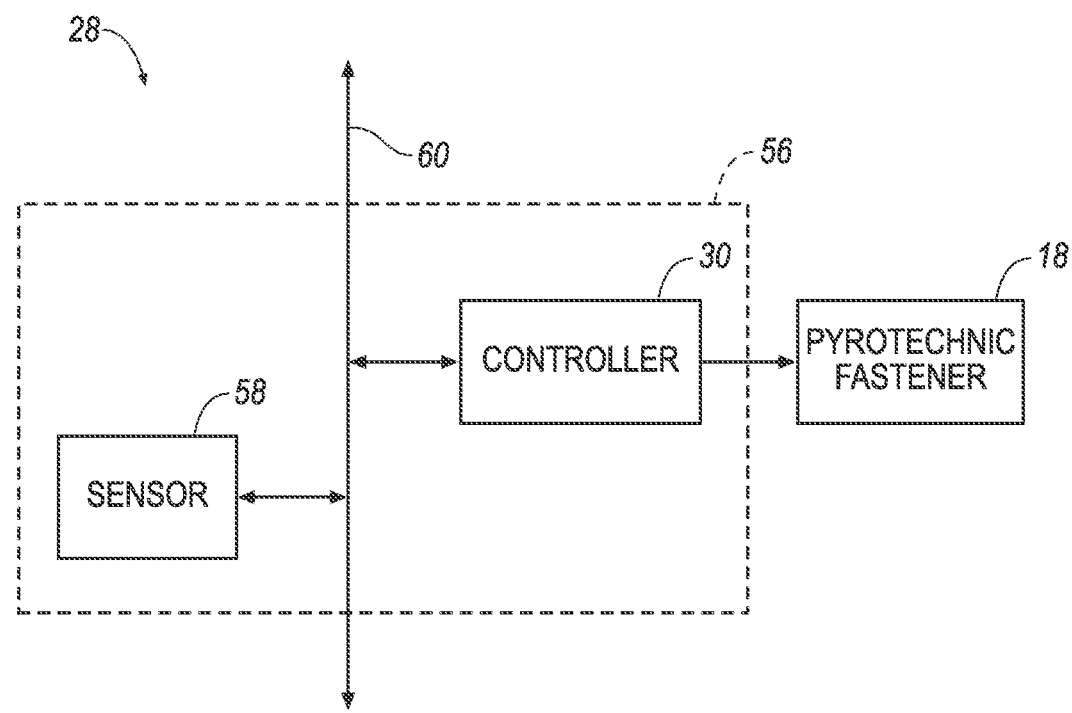
FIG. 9 is a schematic of a vehicle impact system.

A schematic of the vehicle impact system 28 which includes an impact sensing system 56 and the pyrotechnic fastener 18 is shown in FIG. 9. The impact sensing system 56 may include at least one sensor 58 for sensing impact of the vehicle 12, and a controller 30 in communication with the sensor 58 and the pyrotechnic fastener 18 for activating the pyrotechnic element 24, e.g., for providing an impulse to the pyrotechnic charge of the pyrotechnic element 24, when the sensor 58 senses an impact of the vehicle 12. Alternatively or additionally to sensing impact, the impact sensing system 56 may be configured to sense impact prior to impact, i.e., pre-impact sensing. The sensor 58 may be of any suitable type, e.g., using radar, lidar, and/or a vision system. The vision system may include one or more cameras, CCD image sensors, and/or CMOS image sensor, etc.

The controller 30 may be a microprocessor-based controller. The sensor 58 is in communication with the controller 30 to communicate data to the controller 30. Based on the data communicated by the sensor 58, the controller 30 instructs the pyrotechnic element 24 to activate. The controller 30 may be programmed to activate the pyrotechnic element 24 to sever the pyrotechnic fastener 18 in response at least to a front impact of the vehicle 12. Specifically, the sensor 58 may sense the front impact and, based on the sensed front impact, the controller 30 may provide an instruction to the pyrotechnic fastener 18 to activate the pyrotechnic element 24.

The controller 30 and the sensor 58 may be connected to a communication bus 60, such as a controller area network (CAN) bus, of the vehicle 12. The controller 30 may use information from the communication bus 60 to control the activation of the pyrotechnic element 24. The pyrotechnic fastener 18 may be connected to the controller 30, as shown in FIG. 9, or may be connected directly to the communication bus 60.

In operation, the pyrotechnic fastener 18 supports the electronic display 16 on the frame 14, as shown in FIGS. 1-3, 5 and 7-8, under normal operating conditions of the vehicle 12. When the sensor 58 senses an impact of the vehicle 12, the impact sensing system 56 triggers the pyrotechnic fastener 18 to activate the pyrotechnic element 24 to sever the pyrotechnic fastener 18 along the boundary 40 between the first portion 20 and the second portion 22. In particular, based on the type of impact sensed by the impact sensing system 56, the impact sensing system 56 severs the pyrotechnic fastener 18 so that the second portion 22, which is fixed to the electronic display 16, travels to the second position, as shown in FIGS. 4 and 6.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle seat back comprising:
a frame of the seat back;
an electronic display; and
a pyrotechnic fastener supporting the electronic display on the frame, and including a first portion fixed to the frame, a second portion fixed to the electronic display, and a pyrotechnic element releasably interconnecting the first portion and the second portion.

2. The vehicle seat back as set forth in claim 1, further comprising a guide receiving the pyrotechnic fastener.

3. The vehicle seat back as set forth in claim 2, wherein the electronic display is rotatable relative to the guide.

4. The vehicle seat back as set forth in claim 2, wherein the guide defines a slot receiving the second portion.

5. The vehicle seat back as set forth in claim 4, wherein the second portion being moveable along the slot from a first position to a second position.

6. The vehicle seat back as set forth in claim 5, further comprising trim supported by the frame and defining a cavity receiving the electronic display when the second portion is in the second position.

7. The vehicle seat back as set forth in claim 1, wherein the pyrotechnic element is between the first portion and the second portion.

8. The vehicle seat back as set forth in claim 1, wherein the pyrotechnic fastener extends along an axis, and the electronic display is rotatable about the axis.

9. The vehicle seat back as set forth in claim 1, wherein the pyrotechnic fastener includes a shaft having the first portion and the second portion, the pyrotechnic element being disposed in the shaft.

10. A vehicle impact system comprising:
a seat back including a frame;
an electronic display;
a pyrotechnic fastener supporting the electronic display on the frame, and including a first portion fixed to the frame, a second portion fixed to the electronic display, and a pyrotechnic element releasably interconnecting the first portion and the second portion; and
a controller programmed to activate the pyrotechnic element in response to a sensed vehicle impact.

11. The vehicle impact system as set forth in claim 10, further comprising a guide receiving the pyrotechnic fastener.

12. The vehicle impact system as set forth in claim 11, wherein the electronic display is rotatable relative to the guide.

13. The vehicle impact system as set forth in claim 11, wherein the guide defines a slot receiving the second portion.

14. The vehicle impact system as set forth in claim 13, wherein the second portion being moveable along the slot from a first position to a second position.

15. The vehicle impact system as set forth in claim 14, further comprising trim supported by the frame and defining a cavity receiving the electronic display when the second portion is in the second position.

16. The vehicle impact system as set forth in claim 10, wherein the pyrotechnic element is between the first portion and the second portion.

17. The vehicle impact system as set forth in claim 10, wherein the pyrotechnic fastener extends along an axis, and the electronic display is rotatable about the axis.

18. The vehicle impact system as set forth in claim 10, wherein the pyrotechnic fastener includes a shaft having the first portion and the second portion, the pyrotechnic element being disposed in the shaft.

19. The vehicle impact system as set forth in claim 10, further comprising impact sensors in communication with the controller.

* * * * *